United States Patent
Knudsen

(10) Patent No.: US 9,456,409 B2
(45) Date of Patent: Sep. 27, 2016

(54) METHOD AND SYSTEM FOR ROAMING OF A MOBILE COMMUNICATIONS UNIT

(71) Applicant: GLOBETOUCH AB, Stockholm (SE)

(72) Inventor: Bjorn Knudsen, Hasselby (SE)

(73) Assignee: GLOBETOUCH AB, Stockholm (SE)

( * ) Notice: Subject to any disclaimer, the term of this patent is extended or adjusted under 35 U.S.C. 154(b) by 0 days.

(21) Appl. No.: 14/653,284

(22) PCT Filed: Dec. 3, 2013

(86) PCT No.: PCT/SE2013/051438
§ 371 (c)(1),
(2) Date: Jun. 18, 2015

(87) PCT Pub. No.: WO2014/098723
PCT Pub. Date: Jun. 26, 2014

(65) Prior Publication Data
US 2015/0341852 A1    Nov. 26, 2015

(30) Foreign Application Priority Data
Dec. 21, 2012 (SE) .................................. 1251503

(51) Int. Cl.
H04W 48/18 (2009.01)
H04M 15/00 (2006.01)
H04W 8/18 (2009.01)
H04W 8/26 (2009.01)
H04W 8/12 (2009.01)

(52) U.S. Cl.
CPC ......... *H04W 48/18* (2013.01); *H04M 15/8038* (2013.01); *H04W 8/183* (2013.01); *H04W 8/26* (2013.01); *H04W 8/12* (2013.01)

(58) Field of Classification Search
CPC ..... H04W 12/06; H04W 4/24; H04W 60/00; H04W 60/005; H04W 48/16; H04M 15/8038; H04M 15/80; H04M 2215/34; H04M 3/42263
USPC .......................................................... 455/436
See application file for complete search history.

(56) References Cited

U.S. PATENT DOCUMENTS 5,898,780 A    4/1999  Liu et al.
7,185,360 B1   2/2007  Anton, Jr.
(Continued)

FOREIGN PATENT DOCUMENTS

EP    2144458      1/2010
WO    2001076188   10/2001
(Continued)

OTHER PUBLICATIONS

International Search Report dated Jun. 25, 2014, corresponding to PCT/SE2013/051438.
(Continued)

*Primary Examiner* — Kwasi Karikari
(74) *Attorney, Agent, or Firm* — Young & Thompson

(57) ABSTRACT

Method and system for use when a mobile communication device (40) roams between a mobile communication home network (10) and one or several mobile communication networks (20,26,30,36), which device includes a SIM card (41), the method includes the steps of:
a) the device roaming in a first collaborating network (20);
b) the home network allowing the device Internet access to a predetermined Internet address but not general Internet access;
c) the device contacting the predetermined Internet address and the user providing login credentials;
d) associating an IMSI and/or an MSISDN of the SIM card with a user account identified by the login credentials;
e) allowing Internet access to the device in accordance with an agreement tied to the user account.

16 Claims, 4 Drawing Sheets

(56) References Cited

U.S. PATENT DOCUMENTS

| | | |
|---|---|---|
| 2004/0205004 A1 | 10/2004 | Bahl et al. |
| 2007/0124802 A1 | 5/2007 | Anton, Jr. |
| 2010/0136967 A1 | 6/2010 | Du et al. |
| 2011/0122820 A1 | 5/2011 | Bergqvist |
| 2012/0149334 A1* | 6/2012 | Zhang ................ H04L 63/0838 455/411 |

FOREIGN PATENT DOCUMENTS

| | | |
|---|---|---|
| WO | 0211391 | 2/2002 |
| WO | 2005081962 | 9/2005 |
| WO | 2007/089755 A2 | 8/2007 |
| WO | 2007132233 | 11/2007 |
| WO | 2008103446 | 8/2008 |
| WO | 2012064980 | 5/2012 |

OTHER PUBLICATIONS

3GPP TS 23.060 V10.10.0 (Dec. 2012); Technical Specification; 3rd Generation Partnership Project; Technical Specification Group Services and System Aspects; General Packer Radio Service (GPRS); Service Description; Stage 2; (Release 10).

Extended European Search Report, dated Jul. 15, 2016, from corresponding European application.

* cited by examiner

METHOD AND SYSTEM FOR ROAMING OF A MOBILE COMMUNICATIONS UNIT

Method and system for roaming of a mobile communications unit roaming of a mobile communications unit between mobile communication networks in different countries.

BACKGROUND OF THE INVENTION

Presently, it is common for mobile operators to have national mobile communication networks, such as networks for mobile data and/or voice communication, for example GSM, GPRS, 3G, LTE, etc. When a mobile communication unit is brought outside of the coverage area of a certain network and into the coverage area of the network of another operator, conventional roaming gives rise to problems with high and unpredictable costs for data and/or voice communication.

These problems are especially common when it comes to mobile data traffic, where costs during roaming with variable tariffs can amount to more than 1000 times higher per data unit as compared to mobile data traffic in the home network. Many times there are no efficient ways of keeping track of the costs during a stay abroad or the like. As a consequence, a user risks unpleasant surprises regarding mobile data costs when returning from a stay within the coverage area of the network of a foreign operator.

EP2144458 describes a method using an interface means to provide a SIM card with information regarding available networks for data traffic as well as connection costs for said networks.

WO2007132233 describes a method for remotely configuring a mobile communications device, and for registering and authenticating users of such a device. Configuration data is received and converted by the device, and a configuration database is updated using the data. In one example, different Subscriber Identity Module (SIM) cards with different International Mobile Subscriber Identities (IMSI) can be tied to the same user account for roaming.

WO2005081962 describes a method for keeping costs down for voice communication when roaming, by establishing a corresponding Voice over IP (VoIP) call when requesting a voice call from a mobile unit over a cellular network.

WO2008103446 describes a method in which the IMSI of a SIM is associated with a local telephone number (MSISDN) when roaming, in order to enjoy local tariffs.

WO2001076188 describes a method in which a care of address is used with a mobile device when performing IP-based communication.

The international patent application PCT/SE2011/050886, which has not been published on the filing date of the present application, describes a method according to which a local IMSI is automatically distributed to a SIM card in a mobile device roaming into a visited country.

A further problem is the provision to users of access to inexpensive data roaming in a predictable and uncomplicated way, especially in terms of user experience.

SUMMARY OF THE INVENTION

Thus, the invention relates to a method or use when a mobile communication device roams between a mobile communication home network in a home country and one or several mobile communication networks in one or several visited countries, which mobile communication device comprises a Subscriber Identity Module (SIM) card, wherein a digital data interconnection can be established between at least one collaborating network in a respective visited country and the home network so that Internet access can be provided to the mobile device by the home network via said interconnection when the mobile device is connected to the said collaborating network, which method is characterized in that the method comprises the steps of a) the mobile device roaming in the coverage area of a first collaborating network in a first visited country; b) upon a detection of this roaming of the mobile device, the home network allowing Internet access to a predetermined Internet address but not general Internet access to the mobile device; c) the mobile device contacting the predetermined Internet address and the user providing login credentials via the predetermined Internet address; d) upon the said provision of login credentials, associating an IMSI (International Mobile Subscriber Identity) and/or an MSISDN (Mobile Subscriber Integrated Services Digital Network-Number) of the SIM card with a user account identified by the login credentials; e) allowing Internet access to the mobile device in accordance with an agreement tied to the user account.

The invention also relates to a system for providing Internet access to a mobile communication device when the mobile device roams between a mobile communication home network in a home country and one or several mobile communication networks in one or several visited countries, which mobile communication device comprises a Subscriber Identity Module (SIM) card, wherein a digital data interconnection can be establisped between at least one collaborating network in a respective visited country and the home network so that Internet access can be provided to the mobile device by the home network via said interconnection when the mobile device is connected to the said collaborating network, and wherein the said system is connected for communication with the home network, which system is characterized in that the system is arranged to receive information from the home network that the mobile device roams in a collaborating network, and upon the reception of such information instruct the home network to allow Internet access for the mobile device only to a predetermined Internet address but not general Internet access, in that the system comprises an Internet server arranged to be contacted by the mobile device and to accept a login credential from the mobile device, and in that the system is arranged to, upon reception of a valid login credential from the mobile device, store an association between an IMSI (International Mobile Subscriber Identity) and/or an MSISDN (Mobile Subscriber Integrated Services Digital Network-Number) of the SIM card with a user account identified by the login credentials and to instruct the home network to allow Internet access to the mobile device in accordance with an agreement tied to the user account.

BRIEF DESCRIPTION OF THE DRAWINGS

In the following, the invention will be described in detail, with reference to the appended drawings, where.

Figure 1:
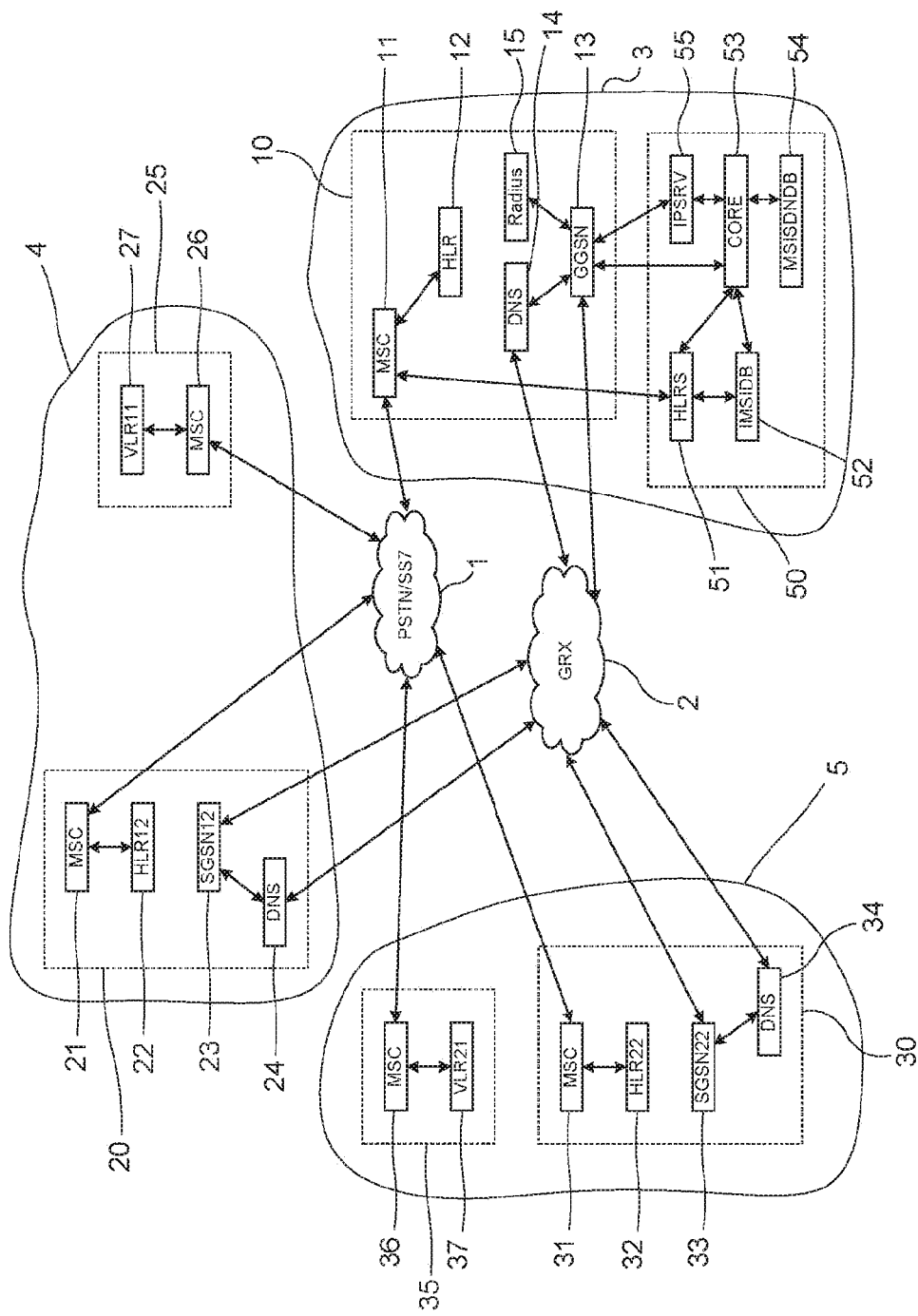
FIG. 1 is a simplified overview diagram of a system according to the present invention for use in a method according to the present invention.

All figures share reference numerals and annotations.

DETAILED DESCRIPTION OF THE PREFERRED EMBODIMENTS

FIG. 1 illustrates a mobile communications network 10 which is a home network to a certain mobile communications device (not shown in FIG. 1). In other words, the mobile device is a subscriber to the home network 10. The home network 10 comprises a Mobile Switching Centre (MSC) 11, a Home Location Register (HLR) 12, a Gateway GPRS Support Node (GGSN) 13, a Dynamic Name Server (DNS) function 14 which is conventional as such and a Remote Authentication Dial In User Service (RADIUS) server 15 which also is conventional as such.

The home network 10 can, however, be of any general type which is able to provide access to mobile communication services to the class of mobile devices which use Subscriber Identity Module (SIM) cards for network identification. In FIG. 1, the home network 10 is a GSM/GPRS network, but it is realized that other types of mobile communication networks in which a mobile communication device is identified using a SIM card are also possible to use with the present invention, such as a 3G and LTE network. The same is true regarding the below described foreign networks 20, 25, 30, 35, as well as to system 50 (below) as applicable.

The home network 10 is operable within a home country 3. The terms "home network" and "home country" are used simply to indicate a geographical location for the network 10, and does not imply a certain nationality of the mobile device user, an operator or such.

A mobile device can thus, when located in the home country 3, connect to the home network 10 and hence obtain access to mobile communications services. The mobile device can be of any suitable type, such as a mobile phone or a mobile data modem, and comprises a SIM card which is used to identify the mobile device to the network using an IMSI code.

Furthermore, the mobile device is capable of roaming to a first visited network 25 and a second visited network 35, both being similar to the home network 10 and to both of which the mobile device identifies itself using an IMSI code via its SIM card. The first visited network 25 is operable in a first visited country 4, which is different from the home country 3. Similarly, the second visited network 35 is operable in a second visited country 5, different from both the home country 3 and the first visited country 4. The first visited network 25 comprises an MSC 26 and a VLR (VLR11) 27. The second visited network 35 comprises an MSC 36 and a VLR (VLR21) 37.

In the first visited country 4, a first collaborating network is also operable. Like the home network 10, the first collaborating network 20 comprises an MSC 21, a HLR (HLR12) 22, a SGSN (SGSN12) 23 and a DNS 24. As will become clear in the following, the operator of the first collaborating network 20 has beforehand entered into an agreement with the operator of the system 50 concerning the provision of mobile communication services.

In a similar way, in the second visited country a second collaborating network 30 is also operable, comprising an MSC 31, a HLR (HLR22) 32, and SGSN (SGSN22) 33 and a DNS 34. There is a similar agreement as to the provision of mobile communication services between the operator of the second collaborating network 30 and the operator of the system 50.

According to the invention, a digital data interconnection can be established between at least one collaborating network 20 in the first, or preferably in each, visited country 4, 5 and the home network 10, so that Internet access can be provided to the mobile device by the home network 10 via said interconnection when the mobile device is connected to the said collaborating network.

In practice, in each country, there may be several visited networks 25, 35 and several collaborating networks 20, 30 in the sense of the present invention. Furthermore, in any country a visited network 25, 35 may be the same as a collaborating network 25, 35.

When roaming, signaling traffic and voice calls are connected over a Public Switched Telephone Network (PSTN) 1, for instance using the SS7 protocol, which PSTN 1 interconnects MSC:s 11, 21, 26, 31, 36. On the other hand, data traffic may be routed via a GPRX Roaming Exchange (GRX) 2, interconnecting the GGSN 13 and DNS 14 with SGSN:s 23, 33 and DNS:s 24, 34.

A system 50 according to one aspect of the invention is furthermore arranged in the home country 3, in connection to the home network 10. The system 50 comprises a HLR (HLRS) 51 which is connected for communication with the home network 10, such as via MSC 11, and also to an IMSI database (IMSIDB) 52. The system 50 also comprises a central module (CORE) 53, which is connected to HLR 51, and also to an MSISDN database (MSISDNDB) 54, an Internet server (IPSRV) 55 and the home network (10), such as to the GGSN 13. The central module 53 also be connected to the IMSIDB 52, in case IMSI is used for association with user account (see below). The Internet server 55 is preferably a web server, arranged to accept calls using the IP protocol and preferably to present a caller with an interactive web interface enabling a login function (see below). Moreover, the Internet server 55 is connected to the GGSN 13 in such a way so that a mobile device roaming into a collaborating foreign network 25, 35 can connect to the Internet server 55 via a foreign SGSN, the GRX 2 and the GGSN 13, alternatively via an Internet tunnel such as a VPN (Virtual Private Network) tunnel.

It is preferred that the system 50 is implemented at a single geographic location, preferably near the home network 10. However, the system 50 may in some embodiments be distributed and/or located at other places, such as in other countries than in the home country 3.

Also, some or all of the functionality described herein in connection to system 50 may also, in some embodiments, be implemented as a part of the home network 10, depending on who is the party operating the home network 10 and the system 50, and upon the contractual arrangements between such parties if they are not one and the same party. Herein, the system 50 is described as a standalone system with its own operator, but it is realized that the method can be analogously applied also in the case where the home network 10 and the system 50 constitute different functionality of one and the same system, possibly with one and the same operator.

Figure 2:
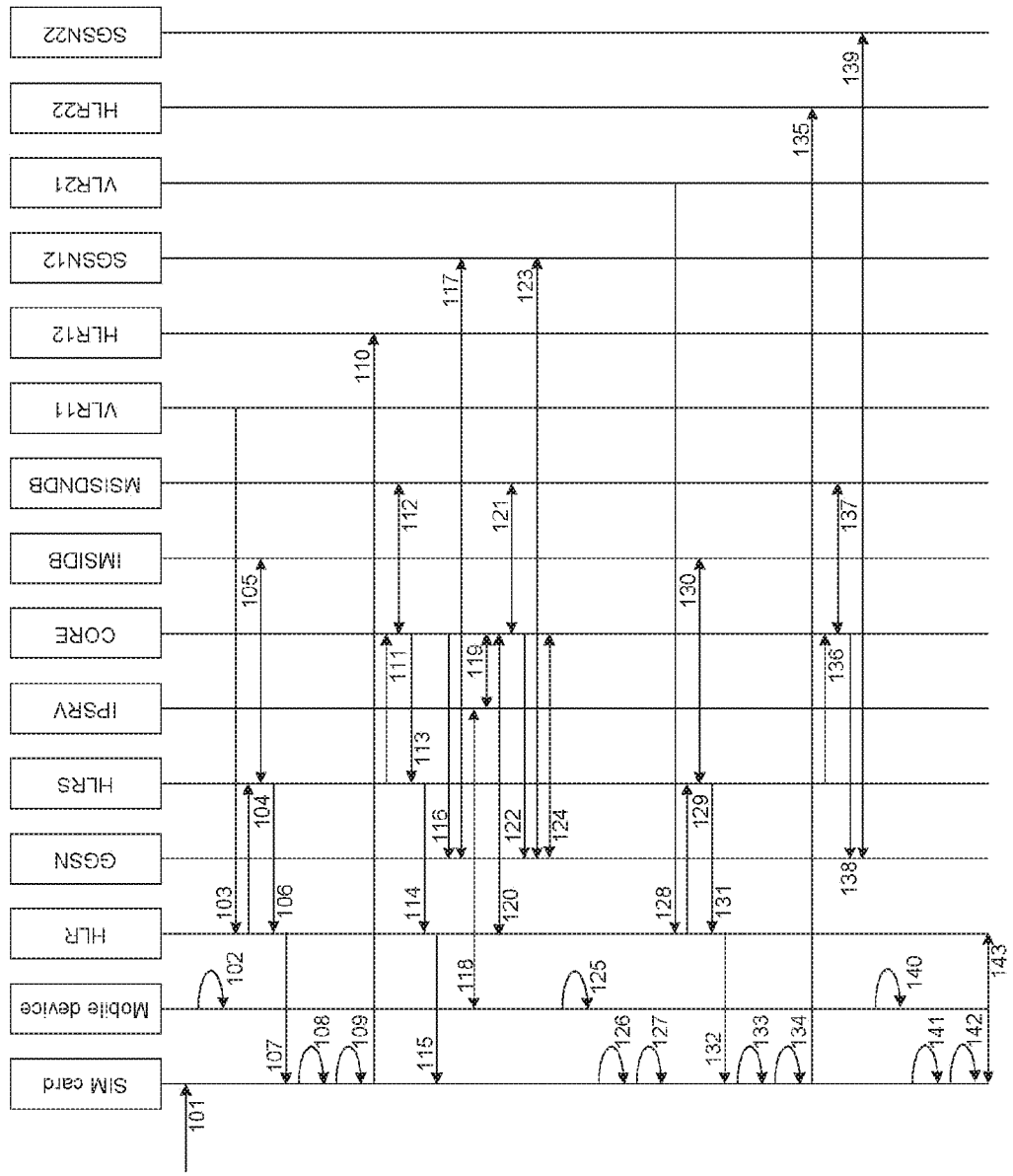
FIG. 2 is a flow chart of a method according to the present invention.

FIG. 2 illustrates, top down, the individual method steps of a method according to the present invention when the above described mobile communication device roams between the home network 10 in the home country 3 and visited networks 25, 35 in visited countries 4, 5.

In a first step 101, a home IMSI, associated with HLR 12, is stored on the SIM card and is used for network identification of the SIM card when the mobile device is within the coverage area of the home network 10 and thus provided access to mobile communication services by the home network 10. This step 101 can for example be taken in connection to the provision of the SIM card to the user of the mobile device, when setting up the subscription to the home network 10. This step may also comprise that the preconfigured SIM card is distributed to the user of the mobile device and inserted into the device.

It is preferred that the said home IMSI is comprised in a predetermined range of IMSI codes domestic to country 3 that, in an initial step, the operator of network 10 and the operator of the system 50 have agreed upon, which IMSI codes are used by those subscribers which are handled by the system 50, and used for identification of SIM cards of such subscribers when located in country 3. Preferably, these IMSI codes are stored in IMSIDB 52, and provided to the home network 10 by HLR 51.

In step 102, the mobile device roams from the home network 10 into the coverage area of the first visited network 25 in the first visited country 4. In other words, the mobile device is brought from the coverage area of the home network 10 to a position in the first visited country 4 within the coverage area of the first visited network 25 in which there is not sufficient network coverage of the home network 10.

This roaming event will, in a step 103, trigger the VLR11 27 of the first visited network 20 to send a location update message to the home network 10, which message is intercepted by the HLR 12 of the home network 10. The location update message includes information about what visited network the VLR11 27 is a part of, and thus indicates that the mobile device has moved from the coverage area of the home network 10 to the coverage area of the first visited network 25.

In a step 104, the HLR 12 forwards the location update information to HLRS 51. Since the home IMSI is comprised in the predetermined range of domestic IMSI codes, HLR 12 can lookup the IMSI contained in the location update, recognize it as the IMSI of a subscriber of the distributed network, and based upon this IMSI information the home network 10 can forward the location update message to HLR 51.

HLR 51 then, in a step 105, retrieves, based on the country 4 and/or visited network 20 in which the mobile device is roaming, a first visiting IMSI from IMSIDB 52. The first visited IMSI is selected by the HLR 51 from a list of available IMSI:s for the first visited country 4, see below. Furthermore, the first visited IMSI is associated with the HLR12 22 of the first collaborating network 20, and is such that a mobile device operating in the network 20 under the identity of the first visited IMSI will be offered local communication tariffs in the first collaborating network 20, especially local tariffs for data traffic. The IMSIDB 52 furthermore comprises associations between domestic IMSI codes and corresponding presently used visited country IMSI codes for all subscribers handled by the system 50 which are currently roaming.

Then, in a step 106, the HLR 51 instructs the home network 10 to send, in a step 107, an instruction message over the air to the mobile device to change, from the home IMSI to the first visited IMSI, the IMSI used for network identification of the SIM card. The IMSI change instruction message can, for instance, be sent from HLR1 12 as an SMS which is received by the SIM card. It is preferred that the provision of the first visited IMSI to the mobile device is fully automatic and does not involve any specific action on the part of the user of the mobile device.

In a step 108, carried out in response to the said IMSI change instruction message, the mobile device stores the received first visited IMSI on the SIM card and uses it for network identification of the SIM card. In addition thereto, the mobile device saves the home IMSI originally used for network identification for later use.

Then, in a step 109, the mobile device performs a device network refresh. This is a locally performed action essentially equivalent to switching the mobile device, or the network connection, off and then on again. In practice the network refresh may be in the form of a SIMOTA refresh or, preferably, a SIMOTA reset. This will cause the mobile device to initiate a location update procedure 110 by sending a location update request message to HLR12 22, comprising the first visited country IMSI. According to a preferred embodiment, the mobile device is caused to send such a message when located within the coverage area of the first collaboration network 20 in the first visited country 4. It is realized that this may be achieved in other ways than by performing a network refresh, such as by manually switching the mobile phone on from a switched off state.

That the "mobile device" receives the message from the HLR 12 in step 107, updates the IMSI in step 108 and performs the device network refresh in step 109 is to be interpreted so that any functional software and/or hardware part of the mobile device is responsible for conducting these and other such tasks. According to a preferred embodiment, which is illustrated in FIG. 2, it is the SIM card which, being a part of the mobile device when installed therein, conducts the above tasks. The corresponding is true regarding steps 126, 127, 133, 134, 141 and 142, below.

After the device network refresh the mobile device will be connected to the HLR12 22 of the first collaborating network 20, since the SIM card identifies itself using the first visited IMSI, being associated with the HLR12 22. In other words, after the device network refresh, the mobile device wakes up in the role of a local mobile subscriber to the first collaborating network 20. As a consequence, the connection to the first visited network 25 will only be temporary, fulfilling the purpose of identifying in the home network 10 the roaming action of the mobile device to the first visited country 4. Note that in the case where the first visited 25 and the first collaborating 20 networks are actually the same, the first visited IMSI will be local to the first visited network 25, and apart from this the invention is analogously applied.

A step 111 is performed upon a detection of the roaming of the mobile device in the first collaborating network 20. Such detection may for instance take place by the home network 10 receiving a signaling message, such as a location update message, from the mobile device via the first collaborating network 20, since the SIM card is provided with the first visiting IMSI which in turn is associated with the home network 10. Based upon the IMSI contained in the signaling message, the home network 10 may then forward the signaling message to the system 50. Since the IMSIDB 52 has an association between the first visited IMSI and the first visited country 4, the system 50 will know that a mobile device with a SIM card provided for operation with the system 50 is now present in the first visited country 4.

Upon the interception of such a signaling message, the HLR 51 in step 111 informs the central module 53 about the message or the detected roaming activity. The information in step 111 preferably comprises what MSISDN is currently used by the SIM card of the roaming mobile device. Then, the central module 53, in a step 112, checks if the MSISDN of the SIM card is already associated with a user account. This check may be made using the MSISDNDB 54, which may store such associations between MSISDN numbers and user accounts.

According to a preferred embodiment of the invention, a user account is associated, in the system 50, with an MSISDN used by the SIM card, and the Internet access of a mobile phone using a certain SIM card is determined by a service agreement previously entered into between the user of the SIM card using said MSISDN and the operator of the system 50 providing said user account. In this case, it is preferred that the same MSISDN is used, after an initial MSISDN assignment in connection with an installation, a first use or a first roaming activity, even after the mobile device roams to the second visited country 5.

According to an alternative embodiment, the IMSI used by the SIM card is instead associated, in system 50, with the said user account. In this case, a new local IMSI may be provided by the system 50 for each new country into which the mobile device roams, such as is illustrated in FIG. 2, and the said new local IMSI may then be associated with the same user account, in for example the IMSIDB 52. Then, before assigning the new IMSI to the SIM card (as described above), it is checked if the current IMSI is associated with an account, and, if this is the case, the user account is instead associated with the new IMSI. Another option if the IMSI is used instead of the MSISDN is to use the same IMSI in several visited countries 4, 5, and to keep the existing association in the IMSIDB 52 between the user account and the IMSI used. In this case, in connection to step 111 it is checked if the IMSI is already associated with a user account.

Furthermore, step sequences 106-109 and 111-117, respectively, may be performed in any order.

If the MSISDN is used to associate the user account and there is not already such association in MSISDNDB 54, in steps 113-115, the central module 53 instructs, via HLR 51, the home network 10, such as the HLR 12 of the home network 10, to send an instruction message over the air to the mobile device to change the MSISDN of the SIM card to an MSISDN provided by the MSISDNDB 54. In case IMSI is used for association with the user account and the above distribution to the SIM card of a first visited country IMSI has not taken place, a new IMSI may now instead be distributed. The distribution of this new IMSI or MSISDN may be similar to the one described above for distributing the first visited country IMSI.

A number of user accounts are preferably stored in the system 50, such as by the central module 53. Each such user account is preferably associated with a certain Internet connectivity eligibility, which is possibly different for different countries 3, 4, 5 and which may comprise limits such as in terms of total time, data load or cost.

If no association between the user account and an MSISDN or an IMSI was found by the central module 53, or if the user account does not indicate that the user of the mobile device is eligible for Internet access in the first visited country 4, the system, in a step 116, instructs the home network 10 to allow the mobile device using the SIM car Internet access to a predetermined Internet address but not general Internet access. Preferably, Internet access is only allowed to a certain single domain or Internet address, and a web browser opened by the mobile device will be instructed to automatically redirect to the said certain domain or Internet address. In the case of a SIM card which has been provided to a user but not yet been used for Internet communication, it is preferred that the GGSN 13 has already in advance been instructed to only allow Internet access to the predetermined Internet address for the SIM card, in order for the user account to be associated with the MSISDN or IMSI of the SIM card before any general Internet access can be provided.

Preferably, the instruction is sent to the GGSN 13 of the home network 10, which either arranges the connectivity limitation itself or instructs the SGSN 23 to do so for the SIM card.

Then, in a step 117, data traffic resulting from use of the mobile device, with its SIM card and identified using the first visited IMSI, is routed between the first collaborating network 20 and the home network 10. In the exemplifying case of a GPRS system, the data traffic is routed between the SGSN12 23 of the first collaborating network 20 and the GGSN 13 of the home network 10 using GRX 2 or alternatively an Internet tunnel. The existing DNS 14, 24 and RADIUS 15 functionality of networks 10, 20 can be used in the normal way.

Hence, the communications of the mobile device in terms of data traffic terminates at the home network 10, and it is the GGSN 13 of the home network 10 which provides the final Internet connection to the mobile device. One preferred possibility is to allow the first collaborating network 20 to use its own GGSN (not shown in FIG. 1) as a proxy router for data traffic between the network 20 and the GGSN 13, since this will allow the collaborating network 20 operator to also monitor data traffic.

It is preferred that the SIM cards used together with the system 50 are configured to only allow signaling and data traffic, and not any voice traffic.

If no general Internet connection was allowed, then the mobile device can only be used to, using the SIM card and the home network 10, access the predetermined Internet address. If no such limitation was imposed, the method instead skips to step 122 (below).

The predetermined Internet address preferably resolves to the Internet server 55, or the mobile device can at least reach the server 55 using the limited Internet access provided in step 116.

In a step 118, a browser or a locally installed application on the mobile device is used to access the predetermined Internet address, via which the user provides login credentials. Preferably, such login credentials only comprise a user identifier, such as a valid e-mail address, a user name or the like, and for example no secret password or PIN code.

In a step 119, the Internet server 55 communicates the credentials to the central module 53. Upon the provision of valid login credentials, the IMSI and/or MSISDN of the SIM card is identified based upon the calling IP (Internet Protocol) address of the mobile device contacting the Internet server 55, which IP address is provided as a part of a call to the Internet server 55. When the IP address of the caller is known, the central module 53 may obtain the IMSI and/or the MSISDN of the caller by querying, in a step 120, the first collaborating network 20, such as via HLR 12, what IMSI and/or MSISDN is associated with the calling IP address. Then, in a step 121, the system 50 associates, in the MSISDNDB 54, the MSISDN currently used by the SIM card with the user account identified by the login credentials. A corresponding scheme is followed using IMSIDB 52 in case IMSI is used for user account association instead of MSISDN.

It is preferred that the Internet server 55 is arranged to provide access to the user of the mobile device to an interactive interface, such as a web page or web service, using which the user may also order or purchase more Internet connectivity.

If, after the communication between the mobile device and the Internet server 55 ends, a valid association between a used MSISDN or IMSI and a user account is present, and the user account dictates that an Internet connection is to be allowed for the SIM card, the method continues to step 122.

In this step, Internet access, preferably general Internet access, is allowed to the mobile device in accordance with a previously negotiated agreement tied to the user account.

This Internet access takes place, in a step 123, via SGSN12 23 and GGSN 13.

In fact, it is preferred that, in both steps 117 and 123, the Internet access is provided via the first collaborating network 20 using the SGSN12 23, the GRX 2, or alternatively an Internet tunnel, and the GGSN 13 of the home network 10.

In a step 124, the system 50 monitors the Internet activity of the mobile device via GGSN 13, and limits Internet connectivity once a predetermined condition according to the above mentioned agreement has been met, such as when the user has used up a predetermined amount of data traffic. It is preferred that, in this case, the Internet connectivity is again limited to the predetermined Internet address as described above, and that the mobile device is then again redirected to the Internet server 55 for claiming or purchasing addition Internet connectivity.

A method according to the present invention, using a SIM card which is not tied to a specific user account until it is used for the first time, allows a user to purchase a SIM card and then, when wanting to use it, simply to insert it into a mobile device which is to be used for data traffic when roaming, open up a browser of a locally installed application, enter a user id such as an e-mail address, and then enjoy virtually immediate Internet access. It is especially preferred that the SIM card is enabled when delivered to the user, and that the PIN code protection of the SIM card is initially disabled or not enabled. This takes the burden off the user to remember and enter a PIN number when using the SIM card. Since the SIM card is not personalized until used, a PIN protection may in many embodiments be unnecessary.

If the SIM card is lost, this poses little security risk since it has not yet been associated with an MSISDN or an IMSI which is tied to a user account. Therefore, the operator of the system 50 can simply note that the local IMSI presently used by the lost SIM card is to be allocated to another SIM card.

Furthermore, the existing infrastructure of the first collaborating network 20 can be used with no or only minor modifications, since the data traffic takes place over the existing GRX 2 or an Internet tunnel, using existing SGSN12 23 and GGSN 13.

If the system 50 is arranged externally to the home network 10, the home network 10 can be operated by an existing mobile operator which has agreed to cooperate with the operator of the system 50. This will provide an opportunity for the home network 10 operator to increase its roaming traffic with only minor modifications of the home network 10, such as redirecting signaling traffic for certain IMSI codes to HLRS 51.

Since the Internet access is only limited in case the SIM card has not been used before or if the account is not presently eligible for Internet access, continuous and essentially seamless Internet access can be provided even in case the mobile device roams between several visited countries 4, 5.

Since the new MSISDN or IMSI to be associated with the user account is distributed by the system 50, dynamic control over what MSISDN numbers and IMSI codes are currently used for Internet traffic when roaming is achieved. Especially, it is then possible to use a pool of MSISDN numbers or IMSI codes for such use, see below.

Since the IMSI or the MSISDN of the SIM card is identified based upon the IP address of the caller to the Internet server 55, no additional functionality needs to be added to this purpose in networks 10, 20.

To use the MSISDN to associate to the user account is advantageous in many situations. For instance, many existing network systems do not support queries for an IMSI given a known IP, but only for an MSISDN. Also, it may often be necessary to provide to a network information comprising a combination of both the IMSI and the MSISDN of a connected party. This latter will be straightforward if an assigned MSISDN is used to associate the user account, since the IMSI in this case can be handled in a conventional way, or by assignment to a respective local IMSI in each roaming country, in both of which cases both the IMSI and the MSISDN will be immediately known to the system 50 for a certain SIM card or user account.

On the other hand, if the IMSI is assigned to a respective local IMSI when roaming, in some embodiments it may be easier to also associate the IMSI with the user account rather than also keeping track of the MSISDN.

According to a preferred embodiment in the case of it being an MSISDN of the SIM card which is associated with the predetermined user account, the MSISDN initially stored on the SIM card, when it is distributed to the user, is blank or is configured not to allow data traffic when roaming. This decreases the risk of abuse if the SIM card is lost before it is used.

According to another preferred embodiment, in the case of it being an MSISDN of the SIM card which is associated with the predetermined user account, the MSISDN of the SIM card is not changed when the mobile device later roams to from the first collaborating network 20 to the second collaborating network 30. Instead, Internet access is in this case allowed based upon the same user account, with the same agreement, and using the same MSISDN in the second collaborating network 30. By holding the MSISDN constant, even if the IMSI changes when moving across country borders, the association to the user account does not have to be updated in that case. This leads to a more seamless Internet connectivity during the roaming process, simpler setup and simpler access to control and follow-up functionality for the operator of the system 50.

In a step 125, the mobile device roams further, now from the coverage area of the first collaborating network 20 to the coverage area of the second visited network 35 in the second visited country 5.

The mobile device is arranged to by itself detect such roaming activity and take appropriate action. In FIG. 2 it is the SIM card which itself detects the roaming event and acts. Thus, as a consequence of the roaming event, the mobile device is arranged to, in a step 126, change the IMSI used for network identification of the SIM card back to the home IMSI, which was previously saved in step 108.

Thereafter, in a step 127, the mobile device again performs a device network refresh. This device network refresh command will, in a step 128, again result in a location update message being sent, now from the VLR21 37 of the second visited network 35 to the home network 10.

In a step 129, the HLR 12 again, like in step 104, forwards the location update information to HLRS 51, based upon the IMSI comprised in the message.

HLR 51 then, in a step 130, retrieves, again based on the country 5 and/or visited network 30 in which the mobile device is roaming, a second visiting IMSI from IMSIDB 52.

Then, in a step 131, the HLR 51 instructs the home network 10 to send, in a step 132, another instruction message over the air to the mobile device, which message is similar to the above described over the air instruction message, but which instructs the mobile device to change, from the home IMSI to the second visited IMSI, the IMSI used for network identification of the SIM card. The second visited IMSI also offers local communication tariffs, especially data traffic tariffs, in the second collaborating network 30, which may or may not be the same as the second visited network 35.

As an alternative to steps 126, 127 and 128, the HLR 12 may be equipped with means for detecting the roaming of the mobile device, which is at the time associated with the HLR 22 of the first collaborating network 20, to the second visited network 35, for example via a message from the second visited network or from the first collaborating network. In this case, the method will directly proceed to step 129.

The reception of the instruction message from the HLR 12 will, in a step 133 and similarly to step 108 above, result in the mobile device storing the second visited IMSI on the SIM card and using it for network identification of the SIM card, while in addition thereto again saving the home IMSI for later use.

Then, similarly to step 109 above, in a step 134, the mobile device will perform a device network refresh.

In a step 135, the mobile device will then connect to the HLR22 32 of the second collaborating network 30 as a local subscriber. This step 135 is thus similar to the step 110 described above.

Upon a detection of the roaming of the mobile device in the second collaborating network 30, such as by the home network 10 receiving and forwarding to the system 50 a location update message from the mobile device via the second collaborating network 20, a step 136, which is similar to step 111 and wherein the HLR 51 informs the central module 53 about the message or the detected roaming activity, is performed. Then, the central module 53, in a step 137, similar to step 112, again checks if the IMSI or MSISDN of the SIM card is already associated with a user account, for instance using the MSISDNDB 54 as described above in connection to step 112.

In the case of the MSISDN being used for association to the user account, such association will already be present in the MSISDNDB 54, and the method will proceed to step 138. In other cases, such as if the IMSI is used for the said association, the second visited country IMSI will be associated with the user account in the IMSIDB 52 before proceeding to step 138.

If the IMSI or MSISDN is validly associated with a user account, which account allows for an Internet connection, the central module 53, in a step 138, instructs the GGSN 13 to allow general Internet access to the mobile device. Otherwise, a limited access to the Internet server 55 is provided, as described above.

Then, in a step 139, data traffic resulting from use of the mobile device, with its SIM card and identified using the second collaborating IMSI, is routed between the second collaborating network 30 and the home network 10, for instance via GRX 2 or an Internet tunnel.

What is said about the relationship between the first visited network 25, the first collaborating network 20 and the home network 10 is also generally applicable to the corresponding relationship between the second visited network 35, the secand collaborating network 30 and the home network 10.

In order to avoid unnecessary location update messages, if the mobile device looses contact with the currently used collaborating network without having travelled to another country, it preferably does not alter its IMSI back to the home IMSI. When the network connection is eventually again available while still located in the same country, the connection to the current collaborating network will still be valid.

If and when, however, the mobile device subsequently roams into the coverage areas of further respective mobile communication networks in another country than the current, for example back to the first visited network 20 in the first visited country 4, a corresponding routine will be followed as the one described in connection to steps 126-134, in which the mobile device reinstitutes the home IMSI for network identification, whereupon the currently visited network sends out a location update message to the HLR 12, which in turn instructs the mobile device over the air to update its IMSI used for network identification to an IMSI which is specific to the currently visited country and an available collaborating network in that country, and which offers local rates therein. During all such roaming activities, the mobile device will thus always operate using a network identifying IMSI which offers local tariffs in a mobile communication network in the country in which it is currently located, while saving the home IMSI for future use.

If there is no available collaborating network in a country into which the mobile device is roaming, it is preferred that communication services, at least data traffic, become unavailable for the mobile device while in that country.

When, in a step 140, the mobile device eventually roams back to the coverage area of the home network 10 in the home country 3, the mobile device as a reaction thereto, in a step 141, changes its IMSI used for network identification of the SIM card back to the home IMSI. Then, in a step 142, it performs a device network refresh. Steps 141 and 142 are thus similar to steps 126 and 127. Thereupon, the mobile device will again, in a step 143, connect to the HLR 12 of the home network 10 as a local subscriber.

Using such a system and method, it is possible for the operator of the home network 10 to guarantee that the communication of a mobile user during roaming will always be using a local identity. As a consequence, relatively low costs can be charged for mobile communication even when roaming. Still, the operator of the distributed network maintains the control over the signaling and data traffic for its subscribers.

When roaming to visited networks from the home network or from another visited network, the change of IMSI to a new, local IMSI will be automatic and virtually immediate since the mobile device itself triggers the IMSI update sequence by reinstituting the original home IMSI upon roaming. Only a minimum of downtime, mainly to allow time for the device network refresh to become effective, will interrupt current communications.

By reverting back to the home IMSI, roaming chains are avoided. That is, if the home IMSI was not reinstituted and the device network refresh not performed by the mobile device, the collaborating network from which the mobile device was roaming to a visited network in another country would, since it considers the mobile device a local one, impart its normal roaming behavior, resulting in normal roaming costs etc.

Furthermore, since the home IMSI is always saved, the IMSI can be restored automatically and immediately when the mobile device returns back to the home network 10.

In case the IMSI is not changed to a local IMSI according to the above described, it is preferred that the SIM card is configured only to connect to a certain collaborating network if the collaborating network in question belongs to a set of predetermined collaborating networks in the visited country in question, such as a list of networks with the operators of which there is a respective agreement with the operator of the system 50. This way, no expensive signaling or data traffic takes place before the traffic can be directed to a collaborating network in the country into which the mobile device roams.

According to a preferred embodiment, at least one of the above referred to first, second or subsequent visited IMSI codes are selected from a respective plurality of IMSI codes, associated with or comprised in the HLR 12 and associated with the respective visited country where the respective visited IMSI is used. Such a plurality of IMSI:s preferably contains less individual IMSI codes than the total number of users being handled by the system 50, and which are the subject of the present method. In other words, all users being subscribers to the home network 10 and the SIM cards of which are handled by the system 50 will share a set of available visited IMSI codes for each of the available visited countries, which set is smaller than the number of such users. Each IMSI in each such plurality is preferably unique to the respective collaborating network to which the IMSI in question is local.

A corresponding pooling of the above referred to predetermined IMSI codes and/or predetermined MSISDN numbers which are used for association with user accounts. Hence, these IMSI codes and/or MSISDN numbers are taken from a predetermined plurality of IMSI codes and/or MSISDN numbers, which plurality comprises less IMSI codes and/or MSISDN numbers than the total number of SIM cards available for using the method and being handled by the system 50. In case IMSI is used for association with user accounts, the same IMSI pool as the one used for visited IMSI codes will be used for IMSI codes associated with user accounts, since for each roaming mobile device they will be the same.

Figure 3:
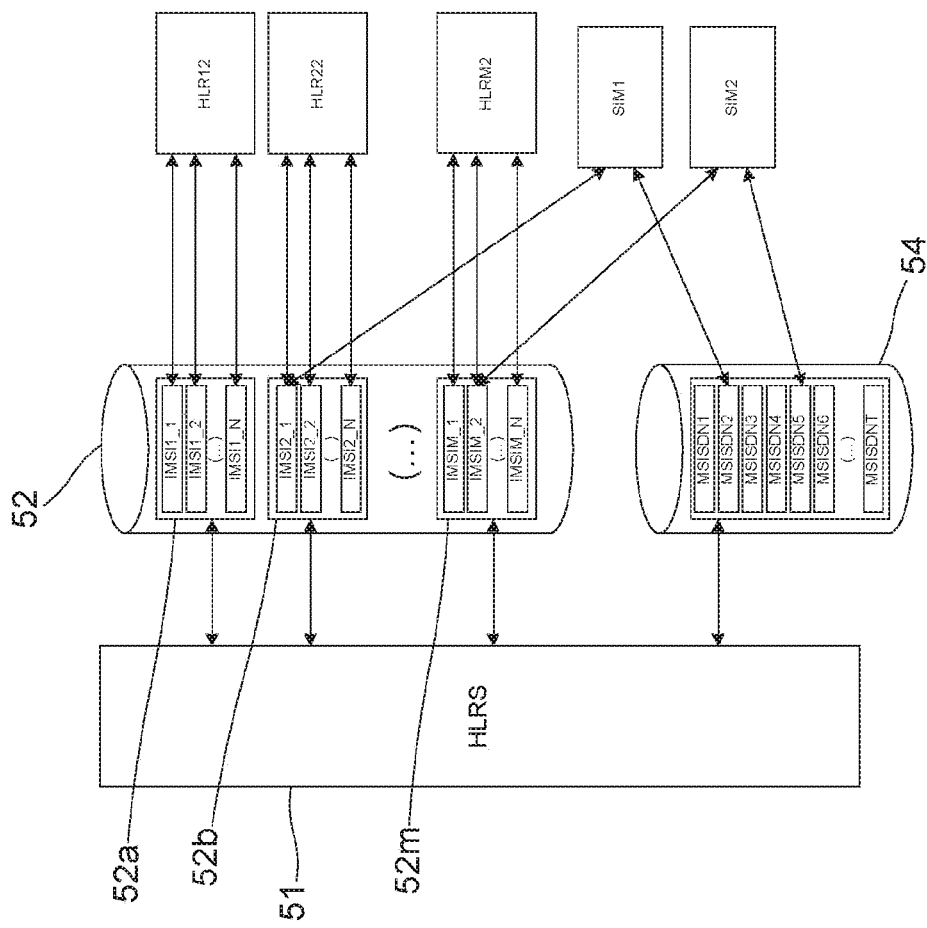
FIG. 3 is a simplified overview diagram of a HLR, and MSISDN database and an IMSI database according to the invention.

FIG. 3 illustrates such IMSI and MSISDN pooling, showing the HLRS 51, the MSISDN database 54 and the IMSI database 52, which databases may be standalone or respective integrated parts of the HLRS 51 itself. The IMSIDB 52 contains one respective IMSI list 52a, 52b, . . . , 52m for each available visited network 1 . . . M. Each such list contains a set of available visited IMSI codes. For example, the list 52a, for the first visited country 4, contains a set of N available IMSI codes (IMSI1_1, IMSI1_2, . . . , IMSI1_N) which are available for use in the first collaborating network 20 in the present method. All IMSI codes in the list 52a are individually associated with the HLR12 22 of the first collaborating network 20, for example via a database entry in the HLR12 22. Correspondingly, each IMSI IMSI2_1, . . . , IMSI2_N is individually associated with the HLR22 32 of the second collaborating network 30.

Preferably, the operator of the system 50 has initially agreed with the respective operator of each available collaborating network to configure such a respective set of IMSI code for use in the present method. Since each IMSI is only temporarily used by a visiting mobile device, it is possible to limit the number of configured IMSI codes to a low number in relation to the number of users.

The MSISDN database comprises a number of MSISDN numbers MISISDN1, MISISDN2, . . . , MSISDNT, where T is a number which preferably is less than the total number of users served by the system 50. Two exemplifying SIM cards, SIM1 and SIM2, are also shown, both associated with a respective IMSI IMSI2_1 and IMSIM_2 and a respective MSISDN MSISDN2 and MSISDN5. Hence, SIM1 is currently roaming into the second visited network 30, and SIM2 is currently roaming into an $M^{th}$ visited network, and they are each using a respective MSISDN which is associated with a respective user account in the MSISDNDB 54.

According to a preferred embodiment, the SIM card installed in the mobile device is provided with a software SIM card application, arranged to monitor in which country and possibly also in which network's coverage area the mobile device is currently located. Such monitoring is preferably carried out by reading the communication between the mobile phone and the network or networks to which the mobile device is currently connected or can connect. Preferably, the country codes present in available networks at the current location of the mobile device are read, and a change of such country codes from one country to another is interpreted as a roaming event of the mobile device. In other words, it is only upon an actual detected change of the current country that steps 126 and 141 are performed as described above.

Further in accordance with this embodiment, the said software application is arranged to perform the above described updating changes of the IMSI used for network identification and arranged to perform the above described device network refresh events. It is furthermore preferred that it is the software application which saves the home IMSI while in a visited network.

A user of an existing mobile device can hence be provided with a new SIM card, which not only is preconfigured for use with a method according to the present invention, but which also comprises the above described preinstalled SIM card software application.

Figure 4:
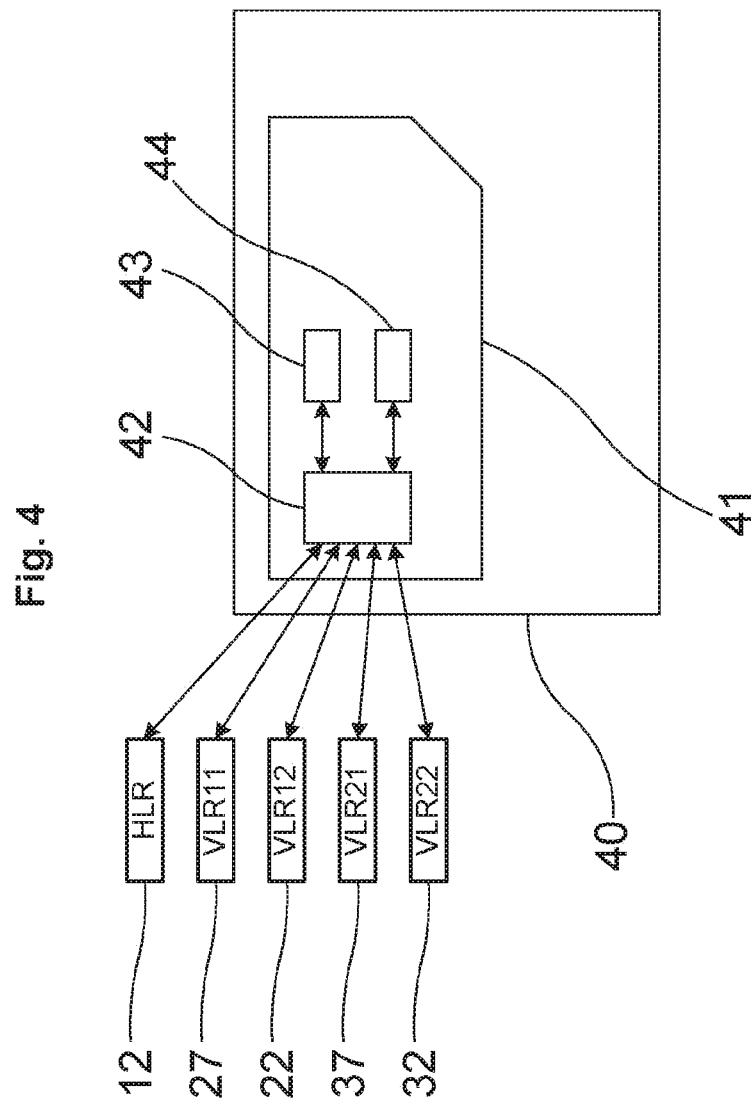
FIG. 4 is a simplified overview diagram of a mobile device having a SIM card according to the present invention.

FIG. 4 illustrates an exemplifying mobile device 40, comprising a SIM card 41 installed in the mobile device 40. FIG. 4 is heavily simplified, and does not, for example, show communication paths between the mobile phone 40 and the SIM card 41; the radio antenna of the mobile phone 40 via which all communication between the SIM card 41 and the external world takes place; etc., but is only intended to illustrate the principles of the present invention.

The SIM card 41 comprises a SIM card software application module 42, which is as described above, and which is connected to two IMSI memory places 43, 44. Naturally, there may be more than two IMSI memory places. An example of the function of the SIM card 41, including the software application 42, according to the present invention is the following.

First, a home IMSI is installed in the memory space 43 and used for network identification in the home network 10.

When the mobile device roams to the first visited network 25, an instruction message is sent from the HLR 12 and is received by the SIM card 41, whereupon the software application 42 replaces the home IMSI with the first visited IMSI in the memory space 43 for use as network identification, as a local subscriber, in the first collaborating network 20, and the home IMSI is instead saved in the memory position 44 for later use. Then the software application 42 performs a device network refresh.

When the mobile phone thereafter roams from the first collaborating network 20 to the second visited network 35, the software application 42 detects this roaming event, since it monitors the country codes of the currently connected network. Hence, it shifts the home IMSI back to the memory position 43 for use as network identification. Then, it performs a device network refresh. This will result, via a location update message from VLR21 37 to HLR 12, in that the SIM card 41 receives a message to again change the IMSI used for network identification to a second visited IMSI. Upon receipt of this message, the software application 42 stores the second visited IMSI in memory location 43 for use as network identification, and again saves the home IMSI in memory location 44. Thereafter the application 42 performs a device network refresh.

When the mobile phone roams back to the home network 10, the software application 42 again recognizes this, as a consequence of its country code monitoring, and as a result reinstalls the home IMSI in the memory position 43 for use as network identification. It then performs a device network refresh.

In practice, the message sent over the air from the HLR 12 to the mobile device to change the IMSI, may include instructions to write a new EF_IMSI, to delete the current IMSI from EF_LOCI, and then to perform a network refresh.

The software application 42 may, in practice, comprise the following logic for use when roaming into one country from another: If the last visited country was the home country 3, then save the current country as the last visited country and back up related information (LOCI, LOCIGPRS, PSLOCI, FPLMN, etc.) as the last used home info. If the last visited country, on the other hand, was not the home country 3, then save the current country as the last visited country and reset related information (IMSI, Ki, OPC, LOCI, LOCIGPRS, PSLOCI, FPLMN, etc.) to the last used home info and try to connect to an available network.

Above, preferred embodiments have been described. However, it is apparent to the skilled person that many modifications may be made to the described embodiments without departing from the basic thought of the invention.

For instance, both IMSI and MSISDN can be used in combination as a key for association with a user account.

Thus, the invention shall not be limited to the described embodiments, but may be varied within the scope of the enclosed claims.

The invention claimed is:

1. A method for use when a mobile communication device roams between a mobile communication home network in a home country and one or several mobile communication networks in one or several visited countries, which mobile communication device comprises a Subscriber Identity Module (SIM) card, wherein a digital data interconnection can be established between at least one collaborating network in a respective visited country and the home network so that Internet access can be provided to the mobile device by the home network via said interconnection when the mobile device is connected to the said collaborating network, wherein the method comprises the steps of:
   a) the mobile device roaming in the coverage area of a first collaborating network in a first visited country;
   b) upon a detection of this roaming of the mobile device, a system instructing the home network to allow Internet access, for the mobile device, to a predetermined Internet address, to which predetermined Internet address the system is connected, but not general Internet access;
   c) the mobile device contacting the predetermined Internet address and the user providing login credentials via the predetermined Internet address to the system;
   d) upon the said provision of login credentials, the system associating an IMSI (International Mobile Subscriber Identity) and/or an MSISDN (Mobile Subscriber Integrated Services Digital Network-Number) of the SIM card with a user account identified by the login credentials; and
   e) the system instructing the home network to allow Internet access to the mobile device in accordance with an agreement tied to the user account.

2. The method according to claim 1, wherein, in steps b) and e), the Internet access is provided by the first collaborating network via an SGSN (Support GPRS Support Node) of the first collaborating network, a GRX (GPRX Roaming Exchange) or an Internet tunnel, and a GGSN (Gateway GPRS Support Node) of the home network.

3. The method according to claim 2, wherein the system is external to the home network, wherein the system is connected to the GGSN of the home network, and wherein it is the system which, in steps b) and e), instructs the GGSN of the home network to allow Internet access to the mobile device.

4. The method according to claim 3, wherein, in an initial step, the SIM card is provided with an IMSI associated with the home network, wherein the home network receives a signaling message in step b), wherein the home network then decides to, based upon the IMSI contained in the signaling message, forward the signaling message to the system, which then instructs the GGSN of the home network to allow Internet access to the predetermined Internet address.

5. The method according to claim 1, wherein, in step d), the IMSI and/or MSISDN of the SIM card is identified based upon the calling IP (Internet Protocol) address of the contacting in step c), and by querying the first collaborating network what IMSI and/or MSISDN is associated with the calling IP address.

6. The method according to claim 1, wherein, in step b), the home network first checks if the IMSI and/or the MSISDN of the SIM card is or are already associated with a user account, and that the said Internet connection to a predetermined Internet address but not general Internet access is only allowed in case no such association exists, or if the user account does not allow the user Internet access.

7. The method according to claim 1, wherein, in step b), the home network first sends an instruction message over the air to the mobile device to change the IMSI and/or MSISDN of the SIM card to the IMSI and/or MSISDN to which the user account will be associated in step d).

8. The method according to claim 7, wherein the predetermined IMSI and/or MSISDN are taken from a predetermined plurality of IMSI codes and/or MSISDN numbers, which plurality comprises less IMSI codes and/or MSISDN numbers than the total number of SIM cards available for using the method.

9. The method according to claim 1, wherein the PIN code protection of the SIM card is initially disabled or not enabled.

10. The method according to claim 1, wherein, in step d), it is an MSISDN of the SIM card which is associated with the predetermined user account.

11. The method according to claim 10, wherein the MSISDN initially stored on the SIM card is blank or does not allow data traffic when roaming.

12. The method according to claim 10, wherein the MSISDN is not changed when the mobile device later roams to a second collaborating network, but that the method is then resumed from step e) with the second collaborating network instead of the first collaborating network.

13. The method according to claim 1, wherein, in an initial step, the SIM card is provided with a home IMSI associated with the home network, and wherein step a) comprises the substeps of
   a1) initiating a location update procedure after or in connection to the mobile device moving from the coverage area of the home network to the coverage area of a first visited network in the first visited country;

a2) triggered by the location update message, sending an instruction message over the air to the mobile device to change, to a first visited country IMSI which is associated with the first collaborating network, the IMSI used for network identification of the SIM card; and a3) causing the mobile device to store the first visited country IMSI on the SIM card and to use it for network identification of the SIM card.

14. The method according to claim 13, wherein, upon roaming from the coverage area of the first collaborating network to the coverage area of a second visited network in a second visited country after step e) has been performed, the method comprises the additional steps f) causing the mobile device to change the IMSI used for network identification of the SIM card back to the home IMSI and then to perform a device network refresh;

g) triggered by a location update message resulting from the change of IMSI used for network identification and received by the home network, sending an instruction message over the air to the mobile device to change, to a second visited country IMSI which is associated with a second collaborating mobile communication network in the second visited country, the IMSI used for network identification of the SIM card; and h) resuming the method from step b), but with the second visited country and the second collaborating network instead of the first visited country and the first collaborating network, respectively.

15. The method according to claim 1, wherein, in step a), the SIM card is configured to be able to connect to the first collaborating network only if the first collaborating network belongs to a set of predetermined collaborating networks for the first visited country.

16. A system for providing Internet access to a mobile communication device when the mobile device roams between a mobile communication home network in a home country and one or several mobile communication networks in one or several visited countries, which mobile communication device comprises a Subscriber Identity Module (SIM) card, wherein a digital data interconnection can be established between at least one collaborating network in a respective visited country and the home network so that Internet access can be provided to the mobile device by the home network via said interconnection when the mobile device is connected to the said collaborating network, and wherein the said system is connected for communication with the home network, wherein the system is arranged to receive information from the home network that the mobile device roams in a collaborating network, and upon the reception of such information instruct the home network to allow Internet access for the mobile device only to a predetermined Internet address but not general Internet access, wherein the system comprises an Internet server which is accessible through said Internet access and arranged to be contacted by the mobile device and to accept a login credential from a user of the mobile device via the mobile device, and wherein the system is arranged to, upon reception of a valid login credential from the mobile device, store an association between an IMSI (International Mobile Subscriber Identity) and/or an MSISDN (Mobile Subscriber Integrated Services Digital Network-Number) of the SIM card with a user account identified by the login credentials and to instruct the home network to allow Internet access to the mobile device in accordance with an agreement tied to the user account.

* * * * *